(12) United States Patent
Fan

(10) Patent No.: US 10,049,191 B2
(45) Date of Patent: Aug. 14, 2018

(54) METHOD AND SYSTEM FOR MANAGING STREAM IN HOME MEDIA NETWORK HAVING A HOME GATEWAY AND A PLURALITY OF DEVICES

(71) Applicant: THOMSON LICENSING, Issy les Moulineaux (FR)

(72) Inventor: Wei Fan, Beijing (CN)

(73) Assignee: THOMSON LICENSING, Issy les Moulineaux (FR)

(*) Notice: Subject to any disclaimer, the term of this patent is extended or adjusted under 35 U.S.C. 154(b) by 188 days.

(21) Appl. No.: 15/106,300

(22) PCT Filed: Dec. 19, 2013

(86) PCT No.: PCT/CN2013/090004
§ 371 (c)(1),
(2) Date: Jun. 19, 2016

(87) PCT Pub. No.: WO2015/089805
PCT Pub. Date: Jun. 25, 2015

(65) Prior Publication Data
US 2016/0335418 A1    Nov. 17, 2016

(51) Int. Cl.
*G06F 21/00* (2013.01)
*G06F 21/10* (2013.01)
(Continued)

(52) U.S. Cl.
CPC .......... *G06F 21/10* (2013.01); *G06F 21/6218* (2013.01); *H04L 12/2805* (2013.01);
(Continued)

(58) Field of Classification Search
CPC . G06F 21/10; G06F 21/6218; H04L 65/4076; H04L 63/08; H04L 63/061;
(Continued)

(56) References Cited

U.S. PATENT DOCUMENTS 7,412,727 B2   8/2008 Kim et al.
7,720,463 B2   5/2010 Marsico
(Continued)

FOREIGN PATENT DOCUMENTS

CN   101175095   5/2008
CN   202737896   2/2013
(Continued)

OTHER PUBLICATIONS

Kahmann et al., "Collaborative Media Streaming in an In-Home Network", IEEE 33rd International Conference on Distributed Computing Systems Workshops, Mesa, Arizona, Apr. 16, 2001, pp. 181-186.

*Primary Examiner* — Syed Zaidi
(74) *Attorney, Agent, or Firm* — Tutunjian & Bitetto, P.C.

(57) ABSTRACT

It is provided a method for managing stream in home media network having home gateway and a plurality of devices comprising; building converged home media index at a home gateway by synchronizing local media index of each of the devices; receiving by a source device a request from a user to play a media stored on the source device at the first render device; assigning a multicast IP and port for streaming of the media by the source device or the home gateway; sending by the source device hash value of the media, the multicast IP and port, and the streaming ID to the first render device, in addition to source device IP and render device IP to the home gateway; checking the media file's metadata and corresponding management policy stored on the converged home media index; notifying the source device that the steam can be transmitted to the first render device when receiving authentication and authorization from the gateway; sending security keys to the source device and the first render device to encrypt and decrypt the stream; and trans-
(Continued)

ferring the media from the source device to the first render device.

18 Claims, 4 Drawing Sheets

(51) Int. Cl.
  *H04L 29/06* (2006.01)
  *G06F 21/62* (2013.01)
  *H04L 12/28* (2006.01)
  *H04N 21/6405* (2011.01)
  *H04N 21/266* (2011.01)
  *H04N 21/436* (2011.01)
  *H04L 12/18* (2006.01)
  *H04N 21/222* (2011.01)
  *H04N 21/433* (2011.01)
  *H04N 21/4367* (2011.01)
  *H04N 21/438* (2011.01)

(52) U.S. Cl.
  CPC ............ *H04L 63/061* (2013.01); *H04L 63/08* (2013.01); *H04L 63/105* (2013.01); *H04L 63/205* (2013.01); *H04L 65/4076* (2013.01); *H04N 21/26616* (2013.01); *H04N 21/43615* (2013.01); *H04N 21/6405* (2013.01); *H04L 12/185* (2013.01); *H04L 63/0457* (2013.01); *H04L 2209/60* (2013.01); *H04N 21/222* (2013.01); *H04N 21/438* (2013.01); *H04N 21/4332* (2013.01); *H04N 21/4367* (2013.01)

(58) Field of Classification Search
  CPC . H04L 63/205; H04L 63/105; H04L 12/2805; H04L 12/185
  USPC .......................................................... 726/1
  See application file for complete search history.

(56) References Cited

U.S. PATENT DOCUMENTS

| | | | |
|---|---|---|---|
| 7,933,274 B2 | 4/2011 | Verma et al. | |
| 2002/0174180 A1* | 11/2002 | Brown | G06F 17/30176 709/203 |
| 2006/0146857 A1* | 7/2006 | Naik | H04L 12/1428 370/432 |
| 2006/0149850 A1* | 7/2006 | Bowman | G11B 27/10 709/231 |
| 2006/0155776 A1* | 7/2006 | Aust | G06F 17/30067 |
| 2006/0215650 A1 | 9/2006 | Wollmershauser et al. | |
| 2007/0088764 A1* | 4/2007 | Yoon | H04L 29/06027 |
| 2007/0192512 A1* | 8/2007 | Kwon | G06F 17/30174 709/248 |
| 2008/0010372 A1* | 1/2008 | Khedouri | G06F 17/30094 709/224 |
| 2008/0077668 A1* | 3/2008 | Oh | H04L 12/2803 709/205 |
| 2009/0183211 A1* | 7/2009 | Yan | H04N 7/17318 725/88 |
| 2009/0268754 A1 | 10/2009 | Palm et al. | |
| 2010/0198992 A1* | 8/2010 | Morrison | G06F 17/30056 709/248 |
| 2010/0281093 A1* | 11/2010 | Poder | H04L 12/185 709/201 |
| 2011/0083073 A1* | 4/2011 | Atkins | H04N 21/4147 715/704 |
| 2012/0023533 A1* | 1/2012 | Wang | H04N 21/4622 725/109 |
| 2012/0051543 A1* | 3/2012 | Evans | H04H 20/106 380/270 |
| 2012/0281532 A1 | 11/2012 | Trivedi | |
| 2013/0013991 A1* | 1/2013 | Evans | H04N 5/765 715/206 |
| 2014/0047073 A1* | 2/2014 | Beme | H04L 65/601 709/219 |
| 2014/0089413 A1* | 3/2014 | Evans | G06F 17/30017 709/204 |
| 2014/0090007 A1* | 3/2014 | Okubo | H04N 21/4302 725/153 |

FOREIGN PATENT DOCUMENTS

| | | |
|---|---|---|
| EP | WO2012150916 | 11/2012 |
| KR | 20110071773 | 6/2011 |

* cited by examiner

Fig. 2B

208 — A authenticated & authorized C and sent the key to C for media M's decryption, together with the multicast IP and port of streaming ID X. (meanwhile, M is still playback at B continuously)

209 — C prepared to receive media M at the Multicast IP and port, and send ACK to A 210 — A starts to retransfer media M from the notified current play progress point, through that multicast IP. Then M is playback at C. Now, M is simultaneously play at B and C 211 — B also receives this retransferred content, and found it has been buffered locally, so just ignore and don't buffer it again.

212 — After the duplicated content has been transferred to C, then B will keep buffering and playing the new content of M 213 — End user at C may find it's an improper content to be played at device B, so he stopped the streaming 214 — User further changes the access authorization of media M to a different higher level at HGW 215 — HGW immediately notify A the media M's access authorization has been changed, and A should reauthorize all access request to media M 216 — Thus if B still requires for media M's playing, A will require for new authorization

METHOD AND SYSTEM FOR MANAGING STREAM IN HOME MEDIA NETWORK HAVING A HOME GATEWAY AND A PLURALITY OF DEVICES

This application claims the benefit, under 35 U.S.C. § 365 of International Application of PCT/CN2013/090004, filed Dec. 19, 2013, which was published in accordance with PCT Article 21(2) on Jun. 25, 2015, in English.

FIELD OF THE INVENTION

The present invention relates to Home Media Streaming, Tracking, and Dynamic Management, and more particularly relates to a method and a system for managing stream in home media network having a home gateway and a plurality of devices.

BACKGROUND OF THE INVENTION

In the scenario of home media play and control, after the streaming connection is established between the source and play devices, it's hard for others to dynamically track, supervise and correspondingly manage the stream.

Some existing solutions cannot solve the above problem. For example, Apple's AirPlay doesn't provide the functionality for others to supervise and take control of an ongoing stream. DLNA Media Server, via AVTransport service, provides the AV playing control interface to intermediate CP (control point) for an ongoing stream.

However, it's impossible for the intermediate CP to dynamically supervise the content of the ongoing stream and take management action accordingly e.g. parental control. Besides, it's not supported to track (if necessary) what content has been played or exert some overall general parental control policy e.g. upfront authentication required if playing some specific contents or play it on some specific device. The Miracast is more like a physical and link layer streaming technology not providing track, supervise and manage by intermediate control device.

SUMMARY OF THE INVENTION

According to an aspect of the present invention, it is provided a method for managing stream in home media network having home gateway and a plurality of devices comprising; building converged home media index at a home gateway by synchronizing local media index of each of the devices; receiving by a source device a request from a user to play a media stored on the source device at the first render device; assigning a multicast IP and port for streaming of the media by the source device or the home gateway; sending by the source device hash value of the media, the multicast IP and port, and the streaming ID to the first render device, in addition to source device IP and render device IP to the home gateway; checking the media file's metadata and corresponding management policy stored on the converged home media index; notifying the source device that the steam can be transmitted to the first render device when receiving authentication and authorization from the gateway; sending security keys to the source device and the first render device to encrypt and decrypt the stream; and transferring the media from the source device to the first render device.

According to another aspect of the present invention, it is provided a system for managing stream in home media network having home gateway and a plurality of devices comprising a processor configured to implement the steps of building converged home media index at a home gateway by synchronizing local media index of each of the devices; receiving by a source device a request from a user to play a media stored on the source device at the first render device; assigning a multicast IP and port for streaming of the media by the source device; sending by the source device hash value of the streaming, and the multicast IP and port to the first render device and the home gateway; checking the media file's metadata and corresponding management policy stored on the converged home media index; notifying the source device that the steam can be transmitted to the first render device when receiving authentication from the gate way; sending security keys to the source device and the first render device to encrypt the stream; and transferring the media from the source device to the first render device.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings:

FIG. 2B is a system chart showing home media streaming, tracking, and dynamical management according to the embodiment of the present invention.

DETAILED DESCRIPTION OF EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

In home network, at the connection establishing phase of a streaming between two devices (from a source device to a play device), the source device should notify home gateway with the media file's distinct hash value as key of media index, and the multicast IP address and port applied for this stream transporting as well as streaming ID for the streaming to be multicast and the source device IP. With this streaming's tracking information, the home gateway can uniquely identify and find the media file's metadata and management policy information from converged media index database stored in the home gateway or some other places for all home media contents. The hash value is calculated based on the media file's path and filename information, and the device ID. The hash value is unique to each media file in home's all media devices. Each device synchronizes its local media file index to the home gateway having the converged media index database, which has a converged overall media index information of all home media files. The management policy could be like, e.g., which type of media is not allowed to be streamed and played to other devices if without specific authentication. Thus a streaming between home devices can be dynamically managed by pre-defined policy like parental control.

The multicast IP address and port are dynamically assigned by the source device or the home gateway to multicast the stream to other home network devices. The streaming ID is dynamically assigned by the source device uniquely marking the streaming to be multicast. Any other devices connected to the home network can connect to the home gateway with necessary authentication and be able to browse and search all current ongoing streaming tracking information including metadata, multicast IP, port, and streaming ID. And, a device in the home network can dynamically request to join a streaming process by just listen and receive that multicast streaming for that media file. It's also possible to require some authentication for joining an ongoing stream. Then, other device can dynamically enjoy the media playing, or just supervise it and take some additional control e.g. stop and forbid it from being streamed between devices. The above processing is explained hereinafter.

Figure 1:
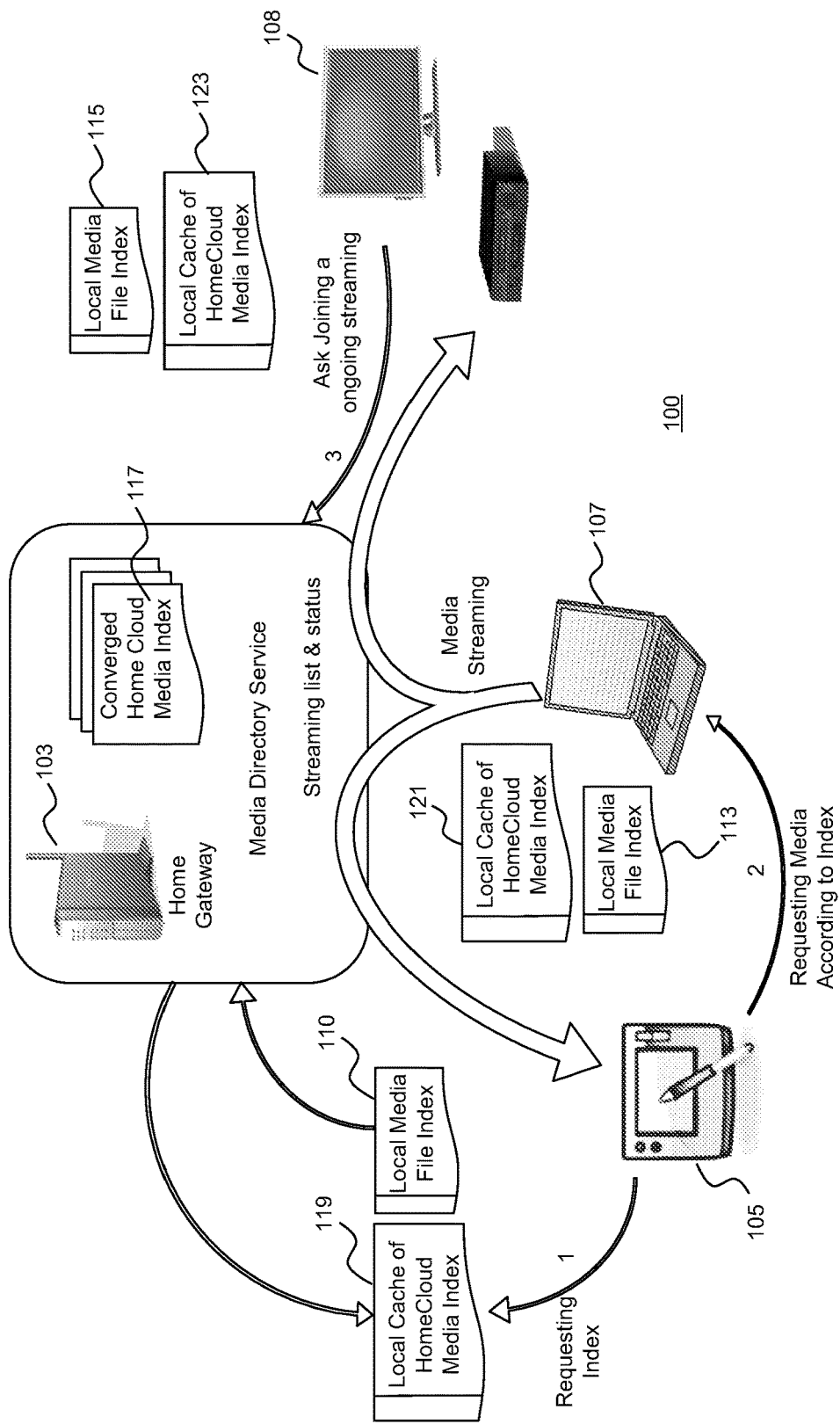
FIG. 1 is a diagram showing media streaming between devices according to the embodiment of the invention.

In FIG. 1, home network 100 includes the first device 105 having the first local media file index 110, the second device 107 having the second local media file index 113, the third device 108 having the third local media file index 115, and home gateway 103. All home media devices 105, 107, 108 generate their local media file index 110, 113, 115 according to a pre-defined procedure and format, and synchronize them to the home gateway 103. Based on that, the home gateway 103 locally maintains a converged home cloud media index 117 and keeps it accessible to all home media device 105, 107, 108. With the home cloud media index 117, each device can browse media information stored in other devices. Each of the first, second, and third device 105, 107, 108 has the first, second, and third local cache of home media index 119, 121, 123, respectively.

When a user of the first device 105 requests media index to the first local cache of home cloud media index 119 and wants to play a media file stored in the second device 107, the user of the first device 105 sends a request to the second device 107. The second device 107 authenticates the request (could further via the home gateway) and dynamically assign a multicast IP (or assigned by the home gateway) and port for the streaming to be multicast.

The second device 107 notifies the first device 105 with that multicast IP and port. The first device 105 is ready to listen, receive the stream data, and playback it locally. Meanwhile, the second device 107 notifies the home gateway 103 with that media file's hash value, the generated multicast IP and port for the streaming to be multicast, the source device IP, and the dynamically generated streaming ID. Besides, the second device 107 also notifies the home gateway 103 that this request is from the first device 105. The first device 105 then waits for the home gateway's confirmation to allow the streaming from the second device 107 to the first device 105. The home gateway 103 receives this streaming tracking information and searches the media file's metadata and corresponding management policy in the gateway's local database. With a policy checking, it requires further authentication since this video is not for everyone in home. The first device 105 receives the authentication request from the home gateway 103 and responses with valid privilege information. Then, after the authentication, the home gateway 103 notifies the second device 107 that this streaming can be started. The home gateway 103 sends to the first and second devices 105, 107 with a pair of security keys to encrypt and decrypt the steaming data since the video is not open for everyone. The first device 105 then successfully playbacks the stream from the second device 107.

During the streaming, the user of the third device 108 finds that there is an ongoing streaming in home network 100 between the first and second devices. After authentication, the user of the third device C takes a check with the streaming metadata information. If the user of the third device 108 wants to have a further supervise over the playing contents, he/she requires a request to join the multicast streaming process. After a further authentication for the streaming request, the third device 108 receives a key from the home gateway 103. And then the third device 108 successfully joins the streaming and playbacks the content locally. The third device 108 now is also able to take control over the streaming e.g. pause, stop. The details of this streaming tracking and dynamical management by the third device 108 is explained in FIGS. 2A and 2B.

Figure 2A:
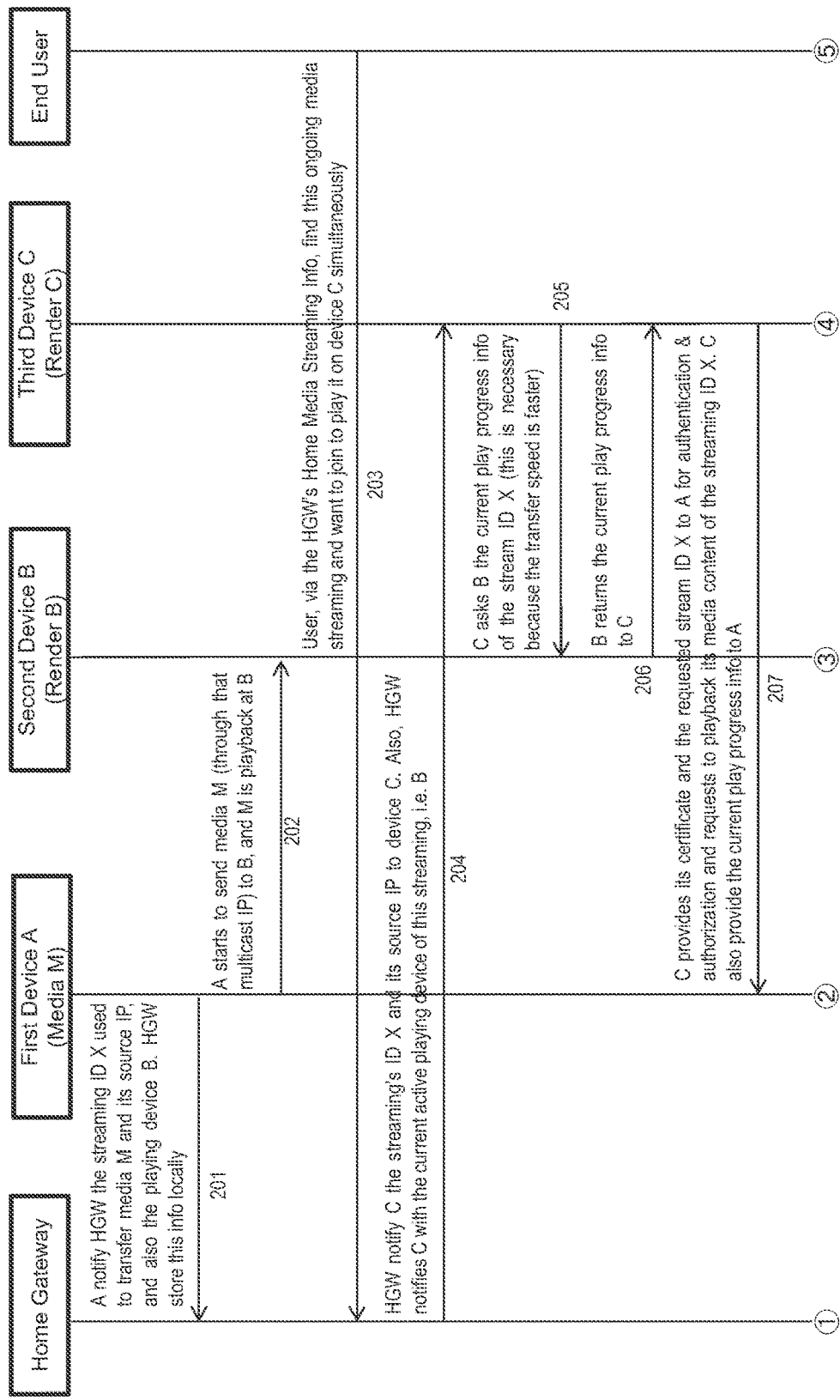
FIG. 2A is a system chart showing home media streaming, tracking, and dynamical management according to the embodiment of the present invention.

In FIGS. 2A and 2B, at step 201, after the authentication and authorization for the second device B were successfully completed, the first device A notifies the home gateway of the streaming ID X used to transfer media M stored therein and its source IP. The first device A also notifies the playing device B of the information. The home gateway stores the information locally. It should be noted that the media hash index value, and the multicast IP and port have already been notified to the home gateway before the authentication. At step 202, the first device A starts to send the media M through the multicast IP to the second device B; and the media M is playback at the second device B. At step 203, an end user finds, via the home gateway's home media streaming information, this ongoing media streaming, and wants to join to play it on the third device C simultaneously. At step 204, the home gateway notifies the third device C of the streaming's ID X and its source IP. Also the home gateway notifies the device C of the current active playing device of this streaming i.e. the second device B. At step 205, the third device C asks the second device B the current play progress information of the streaming ID X. Since the transfer speed is faster than playback speed, the information is necessary. At step 206, the second device B returns the current playing progress information to the third device C. At step 207, the third device C provides its certificate and the requested streaming ID X to the first device A for authentication and authorization; and requests to playback its media content of the streaming ID X. The third device C also provides the play progress point information to the first device A. At step 208, the first device A authenticates and authorizes the third device C; and sends the key to the third device C for media M's decryption, together with the multicast IP and port of streaming ID X. Meanwhile, the media M is still playback at the second device B continuously. At step 209, the third device C prepares to receive the media M at the multicast IP and the port, and sends ACK to the first device A. At step 210, the first device A starts to retransfer the media M from the notified current play progress point, through the multicast IP. Then the media M is playback at the third device C. Now, the media M is simultaneously played at the second device B and the third device C. At step 211, the second B also receives this retransferred content, and founds it has been buffered locally. In this case, the second device B just ignores and doesn't buffer it again. At step 212, after the duplicated content has been transferred to the third device C, then the second device B keeps buffering and playing the new content of the media M. At step 213, the end user at the third device C may find that it's an improper content to be played at the second device B, so he/she stops the streaming. At step 214, the end user further changes the access authorization of the media M to a different higher level at HGW. At step 215, the HGW immediately notifies the first device A that the media M's access authorization has been changed; and the first device A should reauthorizes all access request to the media M. At step 216, thus if the second device B still requires for media M's playing, the first device A requires for new authorization.

Figure 3:
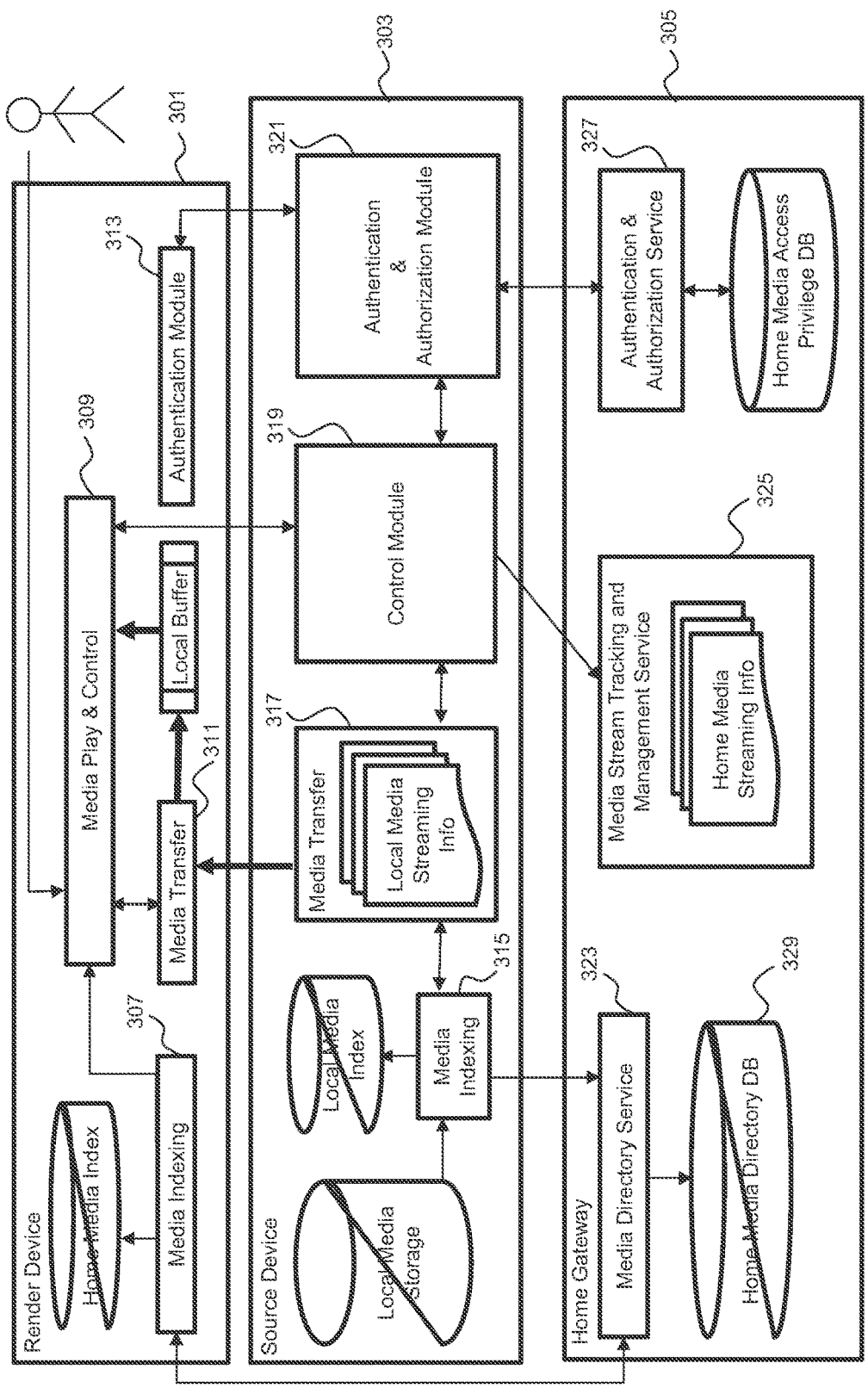
FIG. 3 is a diagram showing devices according to the embodiment of the present invention.

FIG. 3 shows devices included in home media network. The home media network typically includes three types of device: render device 301, source device 303, and home gateway 305.

1. render device 301: it typically includes the modules of media Indexing 307", media play & control 309, media transfer 311, authentication module 313.
   a) media indexing 307: It's responsible to synchronize the homecloud media index 315 from the Home Gateway (HGW), by interoperating with the HGW's "media directory service". And, the home media index is stored locally for user browser and access.
   b) media play & control 309: It presents the home cloud media index 315 onto screen for end user. It follows to end user's play command, and interoperates with the source device's control module 319, requests to access specified media from the source device 303. And it reads the buffered media content from the media transfer module 311, and plays it onto screen for end user.
   c) media transfer 311: It receives the transferred content from the source device 303 via the notified multicast IP and port and buffers it locally for the media play & control 309 module to play.
   d) authentication module 313: Upon the request from the media play & control module 309, it provides its certificate and the request media hash index or streaming ID to the source device 303, and asks for authentication and authorization for this media's access. The authentication and authorization results are notified to the media play & control module 309. And if it's succeeded, the media play & control module 309 also gets notification about the multicast IP and port from the source device's control module 319. And then, the media play & control module 309 notifies the media transfer module 311 to prepare to receive the content to be transferred from the source device.
2. source device 303: It typically includes the modules of media Indexing 315, media transfer 317, control module 319, and authenticate & authorization module 321.
   a) media Indexing 315: It searches the local stored media contents, and generates index of them. The index is stored locally, meanwhile, it is synchronized to the Home Gateway via interoperates with its "media directory service 323" which constructs the overall home media index.
   b) control module 319: Upon transfer request from the render device 301, and after the success authentication result notification from the authentication module 321 of this source device, it prepare and starts to transfer the specified media content to the render device 301. The preparation actions include:
      i. Notify the media transfer module 317 to generate the streaming ID and the transfer port for this media streaming.
      ii. Then send this returned stream ID and transfer port together with the multicast IP assigned by the HGW or this source device 303 to the render device's media play & control module 309.
      iii. Besides, it sends this stream ID and the source device IP and the render device IP to HGW. The stream ID and the source device IP is then cached by HGW's media stream tracking and management service 325.
   c) media transfer 317: Upon the request from the control module 319 to generate the stream ID for this media streaming and the transfer port, it returns these information to the control module 319. And, it locates the requested media through local the media indexing module 315, reads the content and transfers it to the render device. Besides, it caches/stores the streaming ID, transfer port, and media ID locally into the "local media streaming Info".
   d) authentication & authorization module 321: Upon the request from the render device 301, it passes this request information to the HGW's authentication & authorization service 327. HGW then firstly authenticates whether this is a valid requester in the home cloud, if authenticated, and then check whether the requester has the authorization to access this media ID's content. The authentication and authorization results are returned back to the render request device, and corresponding preparation is performed at the source device if it succeeded.
3. home gateway 305: It typically includes media directory service 323, media stream tracking and management service 325, and authentication & authorization service 327.
   a) media directory service 323: It receives the update of each source device's local media index, and stores them into the home media director DB 329. And it also synchronizes these updated changes of each source device's media index to each render devices 301 in the home.
   b) media stream tracking and management service 325: Upon the notification of ongoing media streaming information from the source device 303, it records each ongoing media streaming in the home. The media streaming information reported by the source device 303 should include:
      i. stream ID: generated by the source device 303 for the media streaming it transfers.
      ii. source device IP: the IP of the source device 303.
      iii. render device: the IP of the render device. If multiple render devices there are, then each IP should be reported.
   c) Authentication & Authorization Service 327: It receives the authenticating and authorizing request forwarded from the source device 303 that is originated from the render device 301. And, it checks the provided certificate to the "home media access privilege DB". Then, it returns the check result to the source device 303.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method for managing stream in a media network comprising:
    receiving a request from a first render device to play a media stored on a source device via the source device;
    determining a corresponding management policy of the media stored on converged media index whether the media can be played using a first render device or not, wherein the converged media index is built by synchronizing local media index;
    notifying the source device that the steam can be transmitted to the first render device, if the result of the determining is yes;
    receiving a request from a second render device to join the streaming to play simultaneously on the basis of media streaming information;
    notifying identification data of the streaming and source device IP to the second render device; and
    providing the source device with the identification data of the streaming which was requested for playback on the second render device, and the current play progress information of the streaming so that the source device can jump back to the point to multicast the remaining contents of the stream.

2. The method of claim 1, further comprising:
    sending security keys to the source device and the first render device to encrypt and decrypt for streaming the media.

3. The method of claim 1, wherein the media is recognized by hash value.

4. The method of claim 1, wherein the media is streamed with assigned multicast IP and port.

5. The method of claim 1, further comprising:
    requesting further authentication to the first render device; and
    receiving valid privilege information from the first render device.

6. The method of claim 1, further comprising:
    providing a security key to the second render device after authentication for streaming the media.

7. The method of claim 1, wherein the media is retransferred from the source device through the multicast IP to the first and second render devices from the current play progress point; and if the retransferred content of the media has been buffered locally on the first device, it will be ignored by the first render device.

8. The method of claim 1, further comprising:
    receiving a request from the second render device to instructing the source device to stop the streaming to the first render device if the media is not proper to be played at the first render device.

9. The method of claim 8, further comprising:
    receiving a request from the second render device to change access authorization of the media to different higher level.

10. A device for managing stream in a media network comprising a processor configured to implement:
    receiving a request from a first render device to play a media stored on a source device via the source device;
    determining corresponding management policy of the media stored on converged media index whether the media can be played using a first render device or not, wherein the converged media index is built by synchronizing local media index;
    notifying the source device that the steam can be transmitted to the first render device, if the result of the determining step is yes;
    receiving a request from a second render device to join the streaming to play simultaneously on the basis of media streaming information;
    notifying identification data of the streaming and source device IP to the second render device; and
    providing the source device with the identification data of the streaming which was requested for playback on the second render device, and the current play progress information of the streaming so that the source device can jump back to the point to multicast the remaining contents of the stream.

11. The device of claim 10, wherein the processor is further configured to implement:
    sending security keys to the source device and the first render device to encrypt and decrypt for streaming the media.

12. The device of claim 10, wherein the media is recognized by hash value.

13. The device of claim 10, wherein the media is streamed with assigned multicast IP and port.

14. The device of claim 10, wherein the processor is further configured to implement:
    requesting further authentication to the first render device; and
    receiving valid privilege information from the first render device.

15. The device of claim 10, wherein the processor is further configured to implement:
    providing a security key to the second render device after authentication for streaming the media.

16. The device of claim 10, wherein the media is retransferred from the source device through the multicast IP to the first and second render devices from the current play progress point; and if the retransferred content of the media has been buffered locally on the first device, it will be ignored by the first render device.

17. The device of claim 10, wherein the processor is further configured to implement:
    receiving a request from the second render device to instructing the source device to stop the streaming to the first render device if the media is not proper to be played at the first render device.

18. The device of claim 17, wherein the processor is further configured to implement:
    receiving a request from the second render device to change access authorization of the media to different higher level.

* * * * *